United States Patent
Bloebaum et al.

(10) Patent No.: US 8,311,823 B2
(45) Date of Patent: Nov. 13, 2012

(54) SYSTEM AND METHOD FOR SEARCHING BASED ON AUDIO SEARCH CRITERIA

(75) Inventors: L. Scott Bloebaum, Cary, NC (US); Mark G. Kokes, Raleigh, NC (US)

(73) Assignee: Sony Mobile Communications AB, Lund (SE)

( * ) Notice: Subject to any disclaimer, the term of this patent is extended or adjusted under 35 U.S.C. 154(b) by 1509 days.

(21) Appl. No.: 11/468,845

(22) Filed: Aug. 31, 2006

(65) Prior Publication Data

US 2008/0086539 A1    Apr. 10, 2008

(51) Int. Cl.
  *G10L 15/26* (2006.01)
  *G10L 15/00* (2006.01)
  *G10L 11/00* (2006.01)

(52) U.S. Cl. .................. 704/235; 704/231; 704/270

(58) Field of Classification Search .................. 704/270, 704/235, 231, 275, 270.1
See application file for complete search history.

(56) References Cited

U.S. PATENT DOCUMENTS

| | | | |
|---|---|---|---|
| 5,918,223 A | 6/1999 | Blum et al. | |
| 6,404,856 B1 * | 6/2002 | Wilcox et al. | 379/67.1 |
| 6,505,160 B1 * | 1/2003 | Levy et al. | 704/270 |
| 6,507,643 B1 * | 1/2003 | Groner | 379/88.14 |
| 6,603,921 B1 * | 8/2003 | Kanevsky et al. | 386/96 |
| 6,697,796 B2 * | 2/2004 | Kermani | 1/1 |
| 6,901,207 B1 * | 5/2005 | Watkins | 386/314 |
| 7,039,585 B2 * | 5/2006 | Wilmot et al. | 704/235 |
| 7,054,818 B2 | 5/2006 | Sharma et al. | |
| 7,174,293 B2 * | 2/2007 | Kenyon et al. | 704/231 |
| 7,725,318 B2 * | 5/2010 | Gavalda et al. | 704/251 |
| 7,818,178 B2 * | 10/2010 | Overend et al. | 704/270.1 |
| 7,853,664 B1 * | 12/2010 | Wang et al. | 709/217 |
| 2002/0120456 A1 * | 8/2002 | Berg et al. | 704/278 |
| 2003/0023421 A1 | 1/2003 | Finn et al. | |
| 2003/0125953 A1 | 7/2003 | Sharma | |
| 2003/0145062 A1 | 7/2003 | Sharma et al. | |
| 2004/0199387 A1 * | 10/2004 | Wang et al. | 704/243 |
| 2004/0214555 A1 | 10/2004 | Kumar et al. | |
| 2005/0021826 A1 | 1/2005 | Kumar | |
| 2005/0075881 A1 * | 4/2005 | Rigazio et al. | 704/270 |
| 2005/0216269 A1 * | 9/2005 | Scahill et al. | 704/270.1 |
| 2006/0064499 A1 | 3/2006 | Sharma et al. | |
| 2006/0168095 A1 | 7/2006 | Sharma et al. | |
| 2006/0212897 A1 * | 9/2006 | Li et al. | 725/32 |

FOREIGN PATENT DOCUMENTS

| | | |
|---|---|---|
| WO | 01/11496 | 2/2001 |
| WO | 2006025797 | 3/2006 |

OTHER PUBLICATIONS

International Search Report from corresponding International Application No. PCT/US2007/004032.
International Preliminary Report on Patentability from corresponding International Application No. PCT/US2007/004032.

* cited by examiner

*Primary Examiner* — Jesse Pullias

(74) *Attorney, Agent, or Firm* — Renner, Otto, Boisselle & Sklar, LLP

(57) ABSTRACT

A method of conducting a search includes tagging a user selected segment of audio content that includes search criteria to define an audio clip. The audio clip is captured from the audio content and transferred to a search support function to conduct a search based on the search criteria from the audio clip.

14 Claims, 3 Drawing Sheets

SYSTEM AND METHOD FOR SEARCHING BASED ON AUDIO SEARCH CRITERIA

TECHNICAL FIELD OF THE INVENTION

The present invention relates generally to conducting a search for content based on a segment of audio information. More particularly, the invention relates to a system and method of searching based on an audio clip that a user has selected from audiovisual content to specify criteria for the search.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces.

Mobile telephones and other mobile devices may be used to conduct a search for content. For example, using a wireless application protocol (WAP) Internet browser or a full hypertext markup language (HTML) Internet browser, a user may key in alphanumeric characters to assemble a text-based query to be searched by a search engine. Traditionally, the user of a mobile device who is interested in conducting a search follows an approach that mimics the search strategy associated with personal computers. For instance, the user enters text into a search engine web site, such as the currently popular websites offered by Google and Yahoo.

Text based search strategies are often difficult to use with mobile devices due to the limited user interface of the mobile devices. Most mobile devices do not have a full alphanumeric keyboard or have alphanumeric keyboards with exceedingly small keys. One alternative to text based searching is a voice-based search. For example, Promptu of Menlo Park, Calif. and V-Enable of San Diego, Calif. offer search services where the user speaks into a microphone of the mobile device and the mobile telephone captures the spoken utterance (e.g., spoken phrase) as the desired search criteria. The captured audio data is transmitted to a remote server that converts the audio data to text using a speech recognition engine. Alternatively, the audio data may be converted to another domain or representation of the audio data (e.g., a value-based or grammatical representation). The server then carries out a search on the converted audio data against a database or other collection, and returns a list of search results to the mobile device.

The currently available speech-based search services require the user to speak in a manner that may be processed reliably by the speech recognition engine of the search service. This may be inconvenient to the user (e.g., in a library where the user cannot raise his or her voice) or infeasible in certain environments where noises may corrupt the captured audio data (e.g., in a public area such as a transportation center or in the user's vehicle).

SUMMARY

To improve a user's ability to search for content, there is a need in the art for enhanced search mechanisms including a method and system that allows the user to conveniently transform a portion of existing audio-based content (e.g., stored audiovisual files and streaming audiovisual content) into a search query for desired content.

According to one aspect of the invention, a method of conducting a search includes tagging a user selected segment of audio content that includes search criteria to define an audio clip; capturing the audio clip from the audio content; and transferring the audio clip to a search support function to conduct a search based on the search criteria from the audio clip.

In one embodiment of the method, the search support function is hosted remotely from a local device that captured the audio clip.

In one embodiment, the method further includes receiving search results from the search support function.

In one embodiment of the method, the search support function conducts speech recognition on the audio clip to extract the search criteria.

In one embodiment of the method, the search support function carries out an Internet search or a database search using the extracted search criteria.

In one embodiment of the method, the transferring includes transmitting the audio clip to a server that hosts the search support function.

In one embodiment of the method, the tagging and capturing is carried out by a mobile radio terminal.

In one embodiment of the method, the audio content is stored by the mobile radio terminal.

In one embodiment of the method, the audio content is streamed to the mobile radio terminal.

In one embodiment of the method, the audio content is played to the user and repeated to facilitate tagging in response to user input.

In one embodiment of the method, the tagging is based on command inputs based on user action.

In one embodiment of the method, the command inputs are based on depression of a button by a user.

According to another aspect of the invention, a program stored on a machine readable medium to conduct a search includes executable logic to tag a user selected segment of audio content that includes search criteria to define an audio clip; capture the audio clip from the audio content; and transfer the audio clip to a search support function to conduct a search based on the search criteria from the audio clip.

In one embodiment of the program, the search support function is hosted remotely from a local device that captures the audio clip.

In one embodiment of the program, the audio clip is processed to extract the search criteria and the search support function carries out an Internet search or a database search using the extracted search criteria.

In one embodiment of the program, the executable logic is executed by a mobile radio terminal that plays back the audio content from a locally stored source or from a steaming source.

According to another aspect of the invention, an electronic device includes an audio processing circuit to playback audio content to a user; and a processing device that executes logic to conduct a search, the logic including code that tags a user selected segment of audio content that includes search criteria to define an audio clip; captures the audio clip from the audio content; and transfers the audio clip to a search support function to conduct a search based on the search criteria from the audio clip.

In one embodiment of the electronic device, the electronic device is a mobile radio terminal and further includes a radio circuit to establish communications with a communications network.

In one embodiment of the electronic device, the search support function is hosted remotely from the electronic device.

In one embodiment of the electronic device, the audio clip is processed to extract the search criteria and the search support function carries out an Internet search or a database search using the extracted search criteria.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
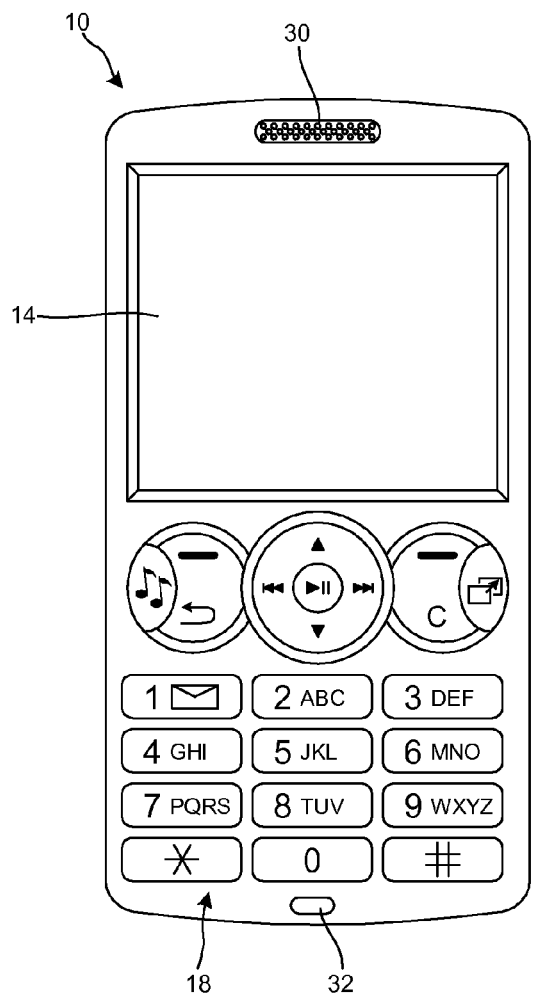
FIG. 1 is a schematic view of a mobile telephone as an exemplary electronic equipment in accordance with an embodiment of the present invention.

The present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment, examples of which include a media player, a gaming device and a computer.

Figure 2:
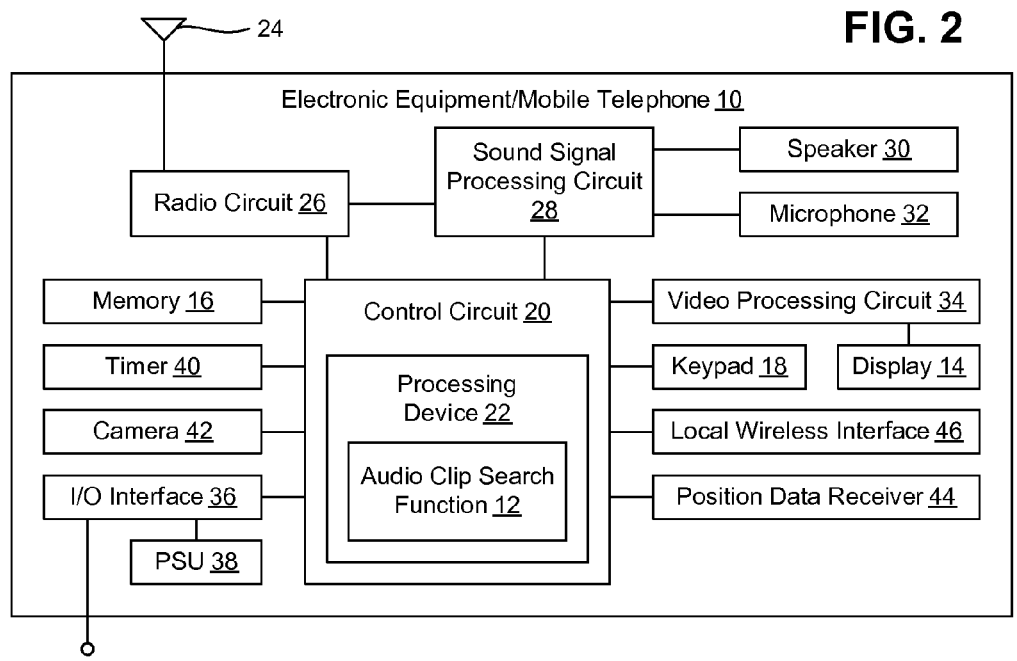
FIG. 2 is a schematic block diagram of the relevant portions of the mobile telephone of FIG. 1 in accordance with an embodiment of the present invention.

Referring initially to FIGS. 1 and 2, an electronic device 10 is shown. The electronic equipment 10 includes an audio clip search function 12 that is configured to interact with audio-visual content to generate an audio clip (e.g., a segment of audio data) that contains search criteria. Additional details and operation of the audio clip search function 12 will be described in greater detail below. The audio clip search function 12 may be embodied as executable code that is resident in and executed by the electronic equipment 10. In one embodiment, the audio clip search function 12 may be a program stored on a computer or machine readable medium. The audio clip search function 12 may be a stand-alone software application or form a part of a software application that carries out additional tasks related to the electronic device 10.

The electronic equipment of the illustrated embodiment is a mobile telephone and will be referred to as the mobile telephone 10. The mobile telephone 10 is shown as having a "brick" or "block" form factor housing, but it will be appreciated that other type housings, such as a clamshell housing or a slide-type housing, may be utilized.

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 of the mobile telephone 10. The display 14 may be used to present images, video and other graphics to the user, such as photographs, mobile television content and video associated with games.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys may also include menu navigation and select keys, for example, for navigating through a menu displayed on the display 16 to select different telephone functions, profiles, settings, etc., as is conventional. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi, WiMax, etc. Another example includes a video enabled call that is established over a cellular or alternative network.

The mobile telephone 10 may be configured to transmit, receive and/or process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as memory 16, in order to carry out operation of the mobile telephone 10. The memory 16 may be, for example, one or more of a buffer, a flash memory, a hard drive, a removable media, a volatile memory, a non-volatile memory or other suitable device.

In addition, the processing device 22 may execute code that implements the audio clip search function 12. It will be apparent to a person having ordinary skill in the art of computer programming, and specifically in application programming for mobile telephones or other electronic devices, how to program a mobile telephone 10 to operate and carry out logical functions associated with the audio clip search function 12. Accordingly, details as to specific programming code have been left out for the sake of brevity. Also, while the audio clip search function 12 is executed by the processing device 22 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, MBMS, WiFi, WiMax, DVB-H, ISDB-T, etc as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 18 and retrieved by the control circuit 22, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream received by the radio circuit 28 or obtained by any other suitable method.

The mobile telephone 10 further includes one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 may also include a timer 40 for carrying out timing functions. Such functions may include timing the durations of calls, generating the content of time and date stamps, etc. The mobile telephone 10 may include a camera 42 for taking digital pictures and/or movies. Image and/or video files corresponding to the pictures and/or movies may be stored in the memory 16. The mobile telephone 10 also may include a position data receiver 44, such as a global positioning system (GPS) receiver, Galileo satellite system receiver or the like.

The mobile telephone 10 also may include a local wireless interface 46, such as an infrared transceiver and/or an RF adaptor (e.g., a Bluetooth adapter), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 3:
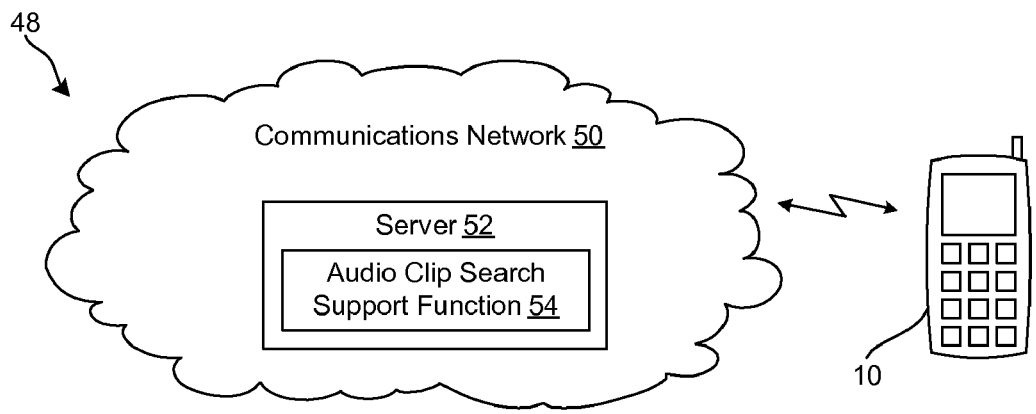
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software containing logical instructions that embody the functions of the server 52. In one embodiment, the server stores and executes logical instructions that embody an audio clip search support function 54. The audio clip search support function 54 may be configured to process audio clips generated by the audio clip search function 12 and return corresponding search results to the mobile telephone 10. Additional details and operation of the audio clip search support function 54 will be described in greater detail below. The audio clip search support function 54 may be embodied as executable code that is resident in and executed by the server 52. In one embodiment, the audio clip search support function 54 may be a program stored on a computer or machine readable medium. The audio clip search support function 54 may be a stand-alone software application or form a part of a software application that carries out additional tasks related to operation of the server 54.

Figure 4:
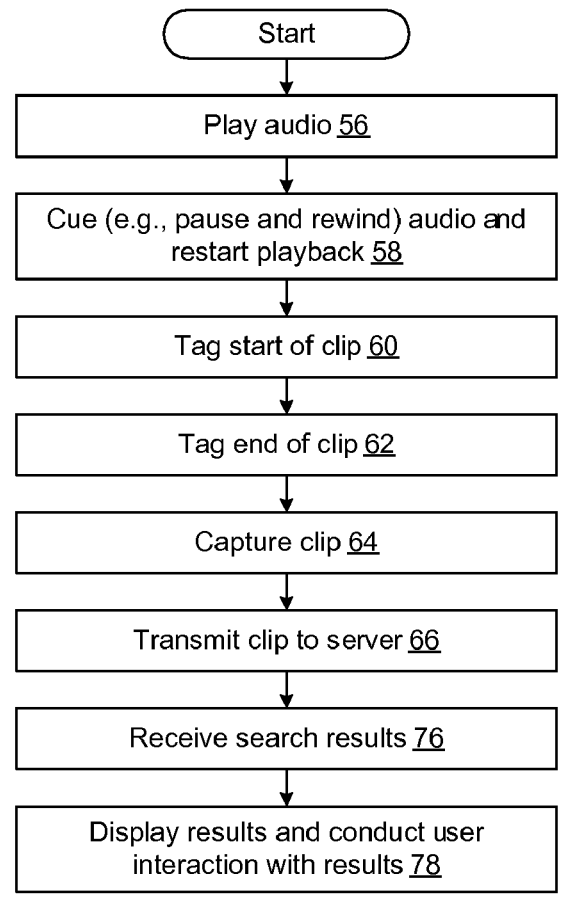
FIG. 4 is a flow chart representing an exemplary method of conducting a search based on audio search criteria with the mobile telephone of FIG. 1.

With additional reference to FIG. 4, illustrated are logical operations performed by the mobile telephone 10 when executing the audio clip search function 12. The flow chart of FIG. 4 may be thought of as depicting steps of a method carried out by the mobile telephone 10. Although FIG. 4 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The logical flow for the audio clip search function 12 may begin in block 56 where audio content is played to the user. The audio content may be derived from any suitable source, such as a stored file, a podcast, a really simple syndication (RSS) feed, a streaming service (e.g., mobile radio) and so forth. As will be appreciated, the audio content may be stored by the mobile telephone or received by the mobile telephone for immediate playback. It is preferable that the user has the ability to control the flow of the audio content (e.g., the ability to stop and/or pause, rewind and resume the playback). Therefore, in one embodiment, the audio content is from a non-broadcast source. In another embodiment, audio data from a broadcast source may be buffered, stored or converted for use in conjunction with the audio clip search function 12.

The audio content may be derived from a source having only an audio component or from a source having multimedia content, such as an audiovisual source having audio and video components. During playback, the audio content may be converted to audible sounds that are output to the user by the speaker 30 or by a speaker of a headset (not shown) that is operatively interfaced to the mobile telephone 10.

As the audio content is played back, the user may hear a phrase (e.g., a word or group of words) for which the user may desired more information. Phrases of interest to the user may appear in a news report, in a song, in an announcement by a announcer (e.g., a disk jockey (DJ)), in a commercial advertisement, a recorded lecture, and so forth. For instance, the played audio content may contain a place, a person's name, a corporate entity, a song title, an artist, a book, a historical event, a medical term, or other item. The user may be interested in finding out more information about the item associated with the played phrase.

As indicated, the audio clip search function 12 may be used to generate an audio clip that contains search criteria for an Internet or database search. The logical functions described below set forth an exemplary way of generating such an audio clip from the audio content that is played back in block 56.

Turning to block 58, when the user hears a phrase of interest that may serve as the basis for a search, the user may cue the audio playback to a point in the audio content prior to the phrase of interest. Cuing the audio content may involve, for example, pausing the audio playback and rewinding the playback. In one embodiment, a user input (e.g., a depression of a key from the keypad 18 or menu option selection) may be used to skip backward a predetermined amount audio content in terms of time, such as about one second to about ten seconds worth of audio content. In the case of audio content that is streamed to the mobile telephone 10, the playback of the audio content may be controlled using a protocol such as real time streaming protocol (RTSP) to allow the user to pause, rewind and resume playback of the streamed audio content.

The playback may be resumed so that the phrase may be replayed to the user. During the replaying of the phrase, the phrase may be tagged in blocks 60 and 62 to identify the portion of the audio content for use as the audio clip. For instance, user input in the form of a depression of a key from the keypad 18 may serve as a command input to tag the beginning of the clip and a second depression of the key may serve as a command input to tag the end of the clip. In another embodiment, the depression of a button may serve as a command input to tag the beginning of the clip and the release of the button may serve as a command input to tag the end of the clip so that the clip corresponds to the audio content played while the button was depressed. In another embodiment, user voice commands or any other appropriate user input action may be used to command tagging the start and the end of the desired audio clip.

In one embodiment, the tag for the start of the clip may be offset from the time of the corresponding user input to accommodate a lag between playback and user action. For example, the start tag may be positioned relative to the audio content by about a half second to about one second before the point in the content when the user input to tag the beginning of the clip is received. Similarly, the tag for the end of the clip may be offset from the time of the corresponding user input to assist in positioning the entire phrase between the start tag and the end tag, thereby accommodating premature user action. For example, the end tag may be positioned relative to the audio content by about a half second to about one second after the point in the content when the user input to tag the end of the clip is received.

Once the start and the end of the clip have been tagged, the clip may be captured in block 64. For instance, the portion of the audio content between the start tag and the end tag may be extracted, excerpted, sampled or copied to generate the audio clip. In some embodiments, the audio clip may be stored in the form of an audio file.

The captured audio clip may be played back to the user so that the user may confirm that the captured content corresponds to audible sounds pertaining to the phrase for which the user wants more information or wants to retrieve related files. If the audio clip does not contain the desired phrase, the user may command the audio clip search function 12 to repeat steps 58 through 64 to generate a new audio clip containing the desired phrase.

In some embodiments, the user may be given the opportunity to edit the audio clip. For example, the user may be provided with options to tag a portion of the audio clip and remove the tagged portion, which may improve search results when extraneous words are present between search terms of greater interest. In another example, the user may be provided with options to merge two or more audio clips. In another example, the user may be provided with options to append an audio clip with a word or words spoken by the user.

Also, the audio clip search function 12 may be configured to process the audio clip. For instance, the audio clip may be processed in preparation for speech recognition processing and/or for searching. The processing may include filtering, audio processing (e.g., digital signal processing) or extraction, conducting initial or full speech recognition functions, etc. Thus, the captured audio clip may contain raw audio data, partially processed audio data or fully processed audio data.

In block 66, the captured audio clip may be transmitted to the server 52. Transmission of the audio clip may be accomplished using any suitable method, such as packaging the audio clip as part of an MMS, using a file transfer technique, as part of a call, or as part of an interactive communication session based on a protocol such as Internet protocol (IP), transmission control protocol (TCP), user datagram protocol (UDP), real time protocol (RTP), etc.

An exemplary variation to the process described thus far may include configuring the audio tagging function (e.g., blocks 60 and 62) to begin automatically when the audio content is rewound. The tagged audio may start at the point in the audio content reached by the rewinding action. In addition, some embodiments may operate in a manner in which tagging the end of the audio clip (block 62) initiates any processing of the audio clip carried out by the mobile telephone 10 and initiates transmission of the audio clip to the server 52. Alternatively, tagging the end of the audio clip may generate a message (e.g., graphical user interface) that prompts the user to choose an option, such as sending, editing or listening to the captured audio clip.

Figure 5:
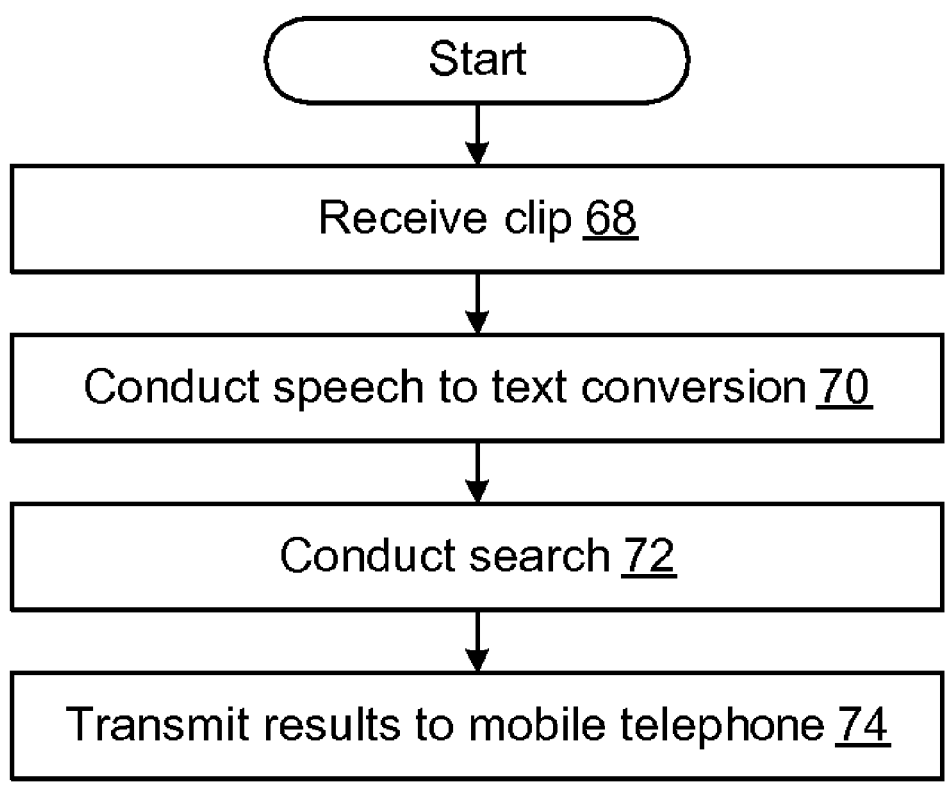
FIG. 5 is a flow chart representing an exemplary method of conducting a search based on audio search criteria with a server that receives the audio search criteria from the mobile telephone of FIG. 1.

With additional reference to FIG. 5, illustrated are logical operations performed by the server 52 when executing the audio clip search support function 54. The flow chart of FIG. 5 may be thought of as depicting steps of a method carried out by the server 52. Although FIG. 5 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The logical flow for the audio clip search support function 54 may begin in block 68 where the server 52 receives the audio clip that was transmitted by the mobile telephone 10 in block 66. As indicated, the transmitted audio clip may contain raw audio data, partially processed audio data or fully processed audio data. Thus, some or all of the steps to process the tagged audio clip into a form useful to a search function of the audio clip search support function 54 may be carried out by the mobile telephone 10.

Next, in block 70 and if not already accomplished by the mobile telephone 10, the audio clip may be converted using a speech recognition engine into search criteria that may be acted upon by a search engine. For instance, the speech recognition engine may convert the audio clip to text using a speech-to-text conversion process. Alternatively, the speech recognition engine may attempt to extract patterns or features from the audio clip that are meaningful in terms of a "vocabulary" set. In this embodiment, the converted audio data has characteristics that may be matched to a collection of searchable information. For instance, the audio data may be converted to another domain or representation of the audio data.

While speech recognition software is undergoing continuous improvement, suitable conversion engines will be know to those of ordinary skill in the art. The speech recognition engine may form a part of the audio clip search support function 54 or may be a separate software application that interacts with the audio clip search support function 54.

Once the audio clip has been converted to search criteria, the audio clip search support function 54 may use the converted audio clip to conduct a search using a search engine. In the case where the audio clip is converted to text, the search engine may use a word or words that form part of the text. The text may be parsed to identify key words for use as search criteria or each word from the converted text may be used in the search string. The search engine may form part of the audio clip search support function 54 or may be a separate software application that interacts with the audio clip search support function 54. The speech recognition engine and/or the search engine may be executed by a server that is different than the server 54 that executes the audio clip search support function 54.

In one embodiment, the search engine may be configured to search the Internet using the search criteria that is derived from the audio clip to identify Internet pages and/or websites that may of interest to the user. For example, the search engine may be implemented in a server that is also used to conduct Internet searches based on text entries made by a user, or the search engine may be implemented in another functional element contained in the network 50 domain or in an Internet service provider (ISP). In other embodiments, the search engine may search a particular database for content and/or files relating to the search criteria. The search may be a general search of the potential sources of content (e.g., the Internet or database) or a search for particular types of content. Thus, the search may be carried out by the server 52, another server that is part of the network 50, or a server that is outside the domain of the network 50. In other embodiments, the search may be carried out by the mobile telephone 10, in which case the search support function may be resident in the mobile telephone 10.

The search engine may be configured to return a full or partial list of matches to the search criteria, and/or to prioritize the matches based on predicted relevancy or other prioritization technique (e.g., the match ordering schemes employed by Yahoo, Google or other common search engine). The types of matches that are returned by the search may depend on the nature of the search criteria. The nature of the search criteria may be determined using a database to match the search criteria to a category or categories (e.g., a song, a person, a place, a book, an artist, etc.) or may be based on the type of content matches that the search generates (e.g., consistent types of matches may reveal a category or categories to which the search criteria belongs). As an example, if the search criteria relates to a song, the returned matches may be links for music sites from which the song is available, associated downloads (e.g., a ringtone, artist wallpaper, etc.), fan websites for the song's artist and so forth. As another example, if the search criteria relates to a book, the returned matches may be links for book vendors from which the book may be purchased, reviews of the book, blogs about the book, etc. As another example, if the search criteria relates to a location, the returned matches may be links to sites with travel blogs, travel booking services, news reports for the location and so forth.

In an embodiment where the audio data is processed such that the resulting search criteria is text or metadata, the search engine may scour the Internet or target database in the manner used by common Internet and database search engines. In an embodiment where the audio data is processed such that the resulting search criteria are extracted patterns or features (e.g., values or phonemes corresponding to a machine useable vocabulary), the search engine may attempt to match the search criteria to reference sources (e.g., Internet pages or database content) that have had corresponding descriptive metadata or content converted into a format that is matchable to the search criteria.

Once the search results are acquired by the search engine, the returned search results may be transmitted to the mobile telephone 10 in block 74. The results may be transmitted in a suitable form, such as links to websites, links to files and so forth. The results may be transmitted using any appropriate protocol, such as WAP.

Returning to the flow chart of FIG. 4, the results may be received by the mobile telephone in block 76. Thereafter, in block 78, the results may be displayed to the user and the user may interact with the search results, such as by selecting a displayed link to retrieve a webpage or a file.

In one embodiment, the audio clip may be formatted for use by a Voice eXtensible Markup Language (VoiceXML) application. For example, the audio clip search support function 54 may be or may include VoiceXML processing functionality. VoiceXML is a markup language developed specifically for voice applications over a network, such as the Internet. VoiceXML Forum is an industry working group that, through VoiceXML Specification 2.1, describes VoiceXML as an audio interface through which users may interact with Internet content, similar to the manner in which the Hypertext Markup Language (HTML) specifies the visual presentation of such content. In this regard, VoiceXML includes intrinsic constructs for tasks such as dialogue flow, grammars, call transfers, and embedding audio files.

In one embodiment, certain portions of the audiovisual content played in block 56 may be associated with metadata, such as a text identification of a spoken phrase. The metadata may be displayed and directly selected by the user as search criteria for a search. Alternative, the metadata may be indirectly selected by the user by tagging the audio content in the manner of blocks 58 through 62. In this embodiment, the metadata may be transmitted to the server 52 as search criteria instead of or in addition to an audio clip and the ensuing search may be carried out using the metadata as a search string.

The above-described methods of searching based on capturing an audio clip may be applied to a search based on a captured video clip. For instance, the user may tag a segment of video or an image, and an associated video clip may be transmitted to the server 52 for processing. Image recognition software may be used to extract a search term from the video clip upon which a search may be carried out.

In another embodiment, the above-described methods of search may be applied to a searched based on captured text. For instance, the user may tag a segment of text from a file, an SMS, an electronic mail message or the like, and an associated text clip may be transmitted to the server 53 for processing. The text clip may directly serve as the search terms upon which a search may be carried out.

The techniques described herein for conducting a search provide the user with the ability to mark a segment of existing audio content, visual content or text, and submit the segment to a search engine that carries out a search on the marked segment of content. As will be appreciated, the marked content may be derived from content that has been stored on the user's device (e.g., by downloading or file transfer) or from actively consumed content (e.g., content that is streamed from a remote location). In this manner, the user may conveniently associate a search for desired content to existing content by establishing search criteria for the search from the existing content. Also, generation of the search criteria need not rely on voice input or alphanumeric text input from the user.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of conducting a search, comprising:
receiving prerecorded audio content with an electronic device;
playing the audio content to a user with the electronic device;
tagging a user selected segment of the played audio content that includes a spoken phrase to define an audio clip;
capturing the audio clip from the audio content;
converting the spoken phrase in the audio clip to text-based search criteria using speech recognition, the text-based search criteria being a textual representation of the spoken phrase; and
transferring the text-based search criteria to a search support function to conduct a text-based Internet search using the text-based search criteria converted from the audio clip.

2. The method of claim 1, wherein the search support function is hosted remotely from a local device that captured the audio clip.

3. The method of claim 2, further comprising receiving search results from the search support function.

4. The method of claim 1, wherein the tagging and capturing is carried out by a mobile radio terminal.

5. The method of claim 4, wherein the audio content is stored by the mobile radio terminal.

6. The method of claim 4, wherein the audio content is streamed to the mobile radio terminal.

7. The method of claim 1, wherein the audio content is played to the user and repeated to facilitate tagging in response to user input.

8. The method of claim 1, wherein the tagging is based on command inputs based on user action.

9. The method of claim 8, wherein the command inputs are based on depression of a button by a user.

10. A non-transient computer readable medium storing a computer program to conduct a search and comprising executable logic to:
receive prerecorded audio content with an electronic device that includes the non-transient computer readable medium;
play the audio content to a user;
tag a user selected segment of the played audio content that includes a spoken phrase to define an audio clip;
capture the audio clip from the audio content;
convert the spoken phrase in the audio clip to text-based search criteria using speech recognition, the text-based search criteria being a textual representation of the spoken phrase; and
transfer the text-based search criteria to a search support function to conduct a text-based Internet search using the text-based search criteria converted from the audio clip.

11. The computer readable medium of claim 10, wherein the search support function is hosted remotely from a local device that captures the audio clip.

12. An electronic device, comprising:
- an audio processing circuit to playback prerecorded audio content that has been received by the electronic device to a user; and
- a processing device that executes logic to conduct a search, the logic including code that:
  - tags a user selected segment of the audio content that has been played to the user and that includes a spoken phrase to define an audio clip;
  - captures the audio clip from the audio content;
  - converts the spoken phrase in the audio clip to text-based search criteria using speech recognition, the text-based search criteria being a textual representation of the spoken phrase; and
  - transfers the text-based search criteria to a search support function to conduct a text-based Internet search using the text-based search criteria converted from the audio clip.

13. The electronic device of claim 12, wherein the electronic device is a mobile radio terminal and further includes a radio circuit to establish communications with a communications network.

14. The electronic device of claim 12, wherein the search support function is hosted remotely from the electronic device.

* * * * *